3,520,053
LAMINATED PANELS INCORPORATING HEATING WIRES

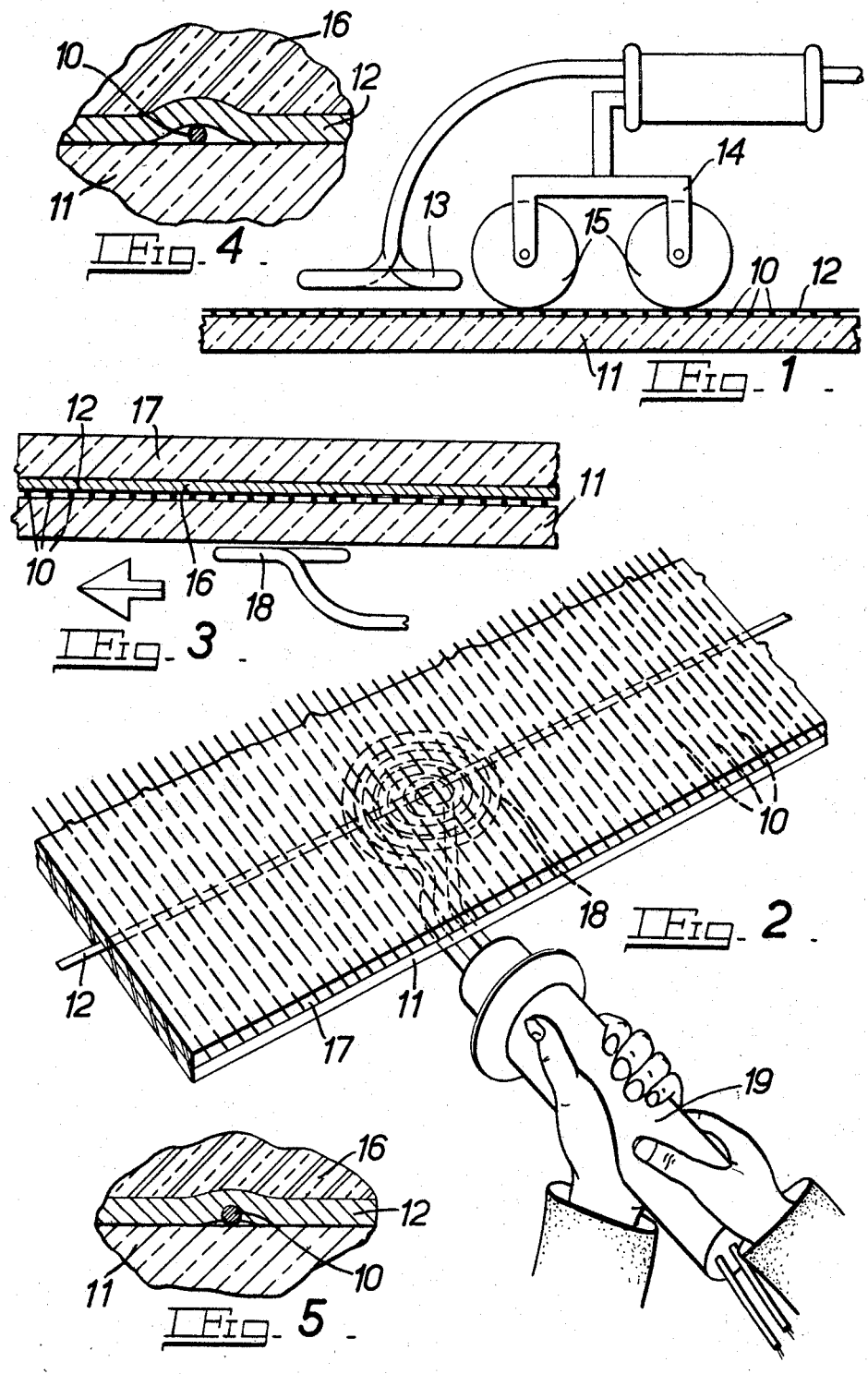

Brian J. Hinton, Alum Rock, Birmingham, and Kenneth F. Kite, Kings Norton, Birmingham, England, assignors to Triplex Safety Glass Company Limited, a British company
Filed June 9, 1967, Ser. No. 644,854
Claims priority, application Great Britain, June 11, 1966, 26,126/66
Int. Cl. H05b 3/00
U.S. Cl. 29—611
7 Claims

ABSTRACT OF THE DISCLOSURE

In making laminated panels incorporating heating wires the heating wires are placed on an even surface and a feed conductor is laid across the wires. The feed conductor comprises a metal strip coated with solder. The feed conductor is heated by high frequency induction so as to melt or soften the solder. The solder is caused or allowed to flow over the adjacent parts of the wires so that when it is subsequently allowed to cool and harden the wires are trapped by the solder. Heating may be effected by an induction coil moved along the feed conductor, though spaced from it. The coil may be carried by a resilient roller which bears on the feed conductor to assist in causing the solder to flow over the wires. Alternatively, the heating may be effected, after the lamination is completed, by a coil which is slid along the panel and is coated with a material having low coefficient of friction.

---

This invention relates to laminated panels incorporating heating wires, and of the kind in which the heating wires are in electrical contact with feed conductors through which, when the panels are in use, electricity is fed to the wires. Such panels may be transparent and used as windscreens or other window-lights in motor vehicles and aircraft.

Hitherto it has often required great care to make satisfactory and reliable contact between the wires and the feed conductors. In a preferred method it has been the practice to lay across the ends of the wires a feed conductor comprising a thin metal strip coated with solder, and to melt the solder locally wtih a soldering iron or similar tool with the aim of soldering the wires to the strip. This method is reasonably satisfactory when using heating wires made of a nickel-chromium alloy or of cupro-nickel, although such wires scarcely adhere at all to the solder, and is capable of use in commercial production of laminated panels when using wires of two or three thousandths of an inch in diameter. Nevertheless the operator must exercise considerable skill in order to avoid damaging or disturbing the wires to one side of the strip with the soldering iron. Particular difficulty is experienced when the wires have been crimped to reduce the diffraction effects in the completed panel. The method is rather less satisfactory when using tungsten wires, which do not adhere to the solder at all, and which are usually thinner than the nickel-chromium and cupronickel wires, typical tungsten wires being half one-thousandth of an inch in diameter.

An object of the invention is to provide a method by means of which these difficulties are avoided or reduced.

From one aspect the present invention consists in a method of securing heating wires to a feed conductor in or for incorporation in a laminated panel, which method comprises placing the wires on an even surface, placing the feed conductor across the wires, the feed conductor comprising a metallic strip coated with solder, heating the feed conductor by high frequency induction so as to melt or soften the solder, and causing or allowing the solder to flow over the adjacent parts of the wires so that the wires become embedded in the solder to an extent such that, when the solder is subsequently allowed to cool and harden, they are trapped by the solder.

From another aspect the invention consists in heating wires and a feed conductor secured together by the method outlined in the last preceding paragraph and for use in or incorporated in a laminated panel.

To assist the flow of solder around the wires pressure may be applied to the strip while the solder is soft.

The invention is not restricted to heating wires in or for incorporation in transparent panels, and may be employed in nontransparent panels. Nevertheless, the invention is expected to find its greatest use in the production of transparent panels as it is only in transparent panels that it is necessary for very fine wires to be used, such wires having to be as inconspicuous as possible; and the difficulties overcome or reduced by the present invention are not so serious when less fine wires are used, as would normally be the case in nontransparent panels.

In a preferred method the wires are no more than 0.003" in diameter, and the metallic feed conductor with its coating of solder is initially no more than 0.003" thick, though a local increase in thickness may occur in use when the solder flows.

The present invention is particularly suitable for use in conjunction with the invention which is the subject of our previous British Pat. No. 972,453. The specification of this previous patent describes other stages in the manufacture of laminated transparent panels, and these will not be repeated here. It is to be understood, however, that the present invention may be used in the manufacture of laminated transparent panels of the kind described in the specification of the said Pat. No. 972,453.

The present invention is usually carried out with the wires placed on the even surface of a sheet of material which will form part of the completed laminated panel, the wires preferably not being moved after being placed in position. It is within the scope of the present invention, however, to secure the wires and feed conductor together on one surface and then to remove the wires and feed conductor from this surface and place them elsewhere.

This invention will now be more particularly described with reference to the accompanying drawings, in which:
FIG. 1 is a diagrammatic side view of apparatus which is being used to carry out the invention;
FIG. 2 is a perspective view showing another form of apparatus being used for carrying out the invention;
FIG. 3 is a diagrammatic section through the laminated panel shown in FIG. 2;
FIG. 4 is a diagrammatic section, to an enlarged scale, showing a heating wire and feed conductor in a laminated panel before the solder has been melted or softened, and
FIG. 5 is similar to FIG. 4 but shows the parts after the solder has been melted or softened.

In the method illustrated in FIG. 1 tungsten wires 10 about 0.0005" in diameter are laid on the flat surface of a sheet of glass 11 and sprayed with a diluted solution of interlayer material to hold them in place, a typical material being a vinyl-butyl aldehyde resin in chloroform. A solder-coated copper strip 12 about 0.003" thick and ⅛" wide is laid across the ends of the wires 10 with the application of a light press so that it forms arches over the wires and lies against the surface of the glass sheet between the wires. This arching is not shown in FIG. 1 as it would introduce undue complexity. The strip 12 is then heated by high frequency induction, with the aid of an induction coil 13 which is mounted in front of a carriage 14 which is moved along the strip. The coil 13 is of longitudinal shape in plan and is suspended above and parallel with the strip as illustrated. The carriage 14 is provided with rollers 15 of a soft, heat-resisting material such as a silicone rubber. The arrangement is such that the rollers press on the strip 12 and assist in causing the solder to flow over the wires 10 beneath it. The method is such that when the solder has cooled the wires are found to be embedded in it, so that it either surrounds the wires entirely or leaves such a small gap on the underside that the wires are positively trapped by the solder. In use the strip 12 acts as a feed conductor to carry an electric current to the heating wires.

In another, and preferred, form of this method which is illustrated in FIG. 2 the lamination is completed before the induction heating is effected. After the strip 12 has been laid over the wires the interlayer 16 is placed on them and an upper sheet of glass 17 is placed on the interlayer 16. The assembly is then heated and subjected to pressure in the usual way. Finally, the strip 12 is heated by induction to melt or soften the solder which flows in the manner described above. The induction coil 18 is similar to the coil 13 used in the method previously described, and it is mounted on a handle 19 so that it can be manipulated by an operator along the underside of the lower sheet of glass 11 close to the surface of the glass as shown in FIGS. 2 and 3. In FIG. 3, as in FIG. 1, the strip 12 is shown as being straight and not arched, for clarity. The coil may be coated with a material having a low coefficient of friction, so that the coil can be moved in sliding contact with the surface of the glass. This method is particularly valuable because when it is used the wires 12 are protected when the coil and its accompanying flex pass along the strip, and therefore cannot be accidentally damaged or displaced.

The frequency of the supply to the induction coil and the power dissipated can best be determined by experiment in any particular circumstances.

What we claim is:

1. A method of securing heating wires to a feed conductor for incorporation in a laminated panel, which method comprises placing the wires on an even surface, placing the feed conductor across the wires, the feed conductor comprising a metallic strip coated with solder, heating the feed conductor by high frequency induction so as to melt the solder, and allowing the solder to flow over the adjacent parts of the wires so that the wires become embedded in the solder to an extent such that, when the solder is subsequently allowed to cool and harden, they are trapped by the solder.

2. A method according to claim 1 the high frequency induction heating is effected by means of an induction coil, moved along the feed conductor while spaced from the feed conductor, the coil being carried by roller means which rolls along and bears on the feed conductor as the coil moves along the feed conductor, the arrangement being such that pressure exerted by the roller means assists in causing the solder to flow over the wires.

3. A method according to claim 2 in which the heating wires are adhesively secured to the surface before the roller means moves along the feed conductor.

4. A method according to claim 2 in which the roller means comprises at least one resilient roller which rolls along and bears on the feed conductor.

5. A method of securing heating wires within a multi-sheet laminated panel comprising placing the wires on one side of one sheet of the laminated panel, placing a feed conductor across the wires, the feed conductor comprising a metallic strip coated with solder, placing over the wires and feed conductor a second sheet of the laminated panel, heating the feed conductor by high frequency induction so as to melt the solder, and allowing the solder to flow over the adjacent parts of the wires so that they become embedded in the solder to an extent such that when the solder is subsequently allowed to cool and harden, the wires are trapped by the solder between the sheets.

6. A method according to claim 5 in which the high frequency induction heating is effected by means of an induction coil moved over the panel adjacent to and lengthwise of the feed conductor.

7. A method according to claim 6 in which the induction coil is caused to slide along the panel and is coated with a material having a low coefficient of friction.

References Cited

UNITED STATES PATENTS

| 2,278,072 | 3/1942 | Gould et al. | 29—621 X |
| 2,644,066 | 6/1953 | Glynn | 29—621 X |
| 3,340,600 | 9/1967 | Harris | 29—502 X |
| 3,383,762 | 5/1968 | Leclerco | 29—621 X |

JOHN F. CAMPBELL, Primary Examiner

U.S. Cl. X.R.

29—621; 219—10.41